United States Patent
Lichtenberg

[11] 3,854,411
[45] Dec. 17, 1974

[54] MECHANICALLY SETTABLE SWITCH FOR A MAGNETIC SUSPENSION RAILROAD

[75] Inventor: Alfred Lichtenberg, Erlangen, Germany

[73] Assignee: Siemens Aktiengesellschaft, Munich, Germany

[22] Filed: Aug. 15, 1973

[21] Appl. No.: 388,562

[30] Foreign Application Priority Data
Aug. 25, 1972 Germany............................ 2241792

[52] U.S. Cl. ........................... 104/148 MS, 308/10
[51] Int. Cl. ........................ B61b 13/08, B60m 7/00
[58] Field of Search........ 104/148 MS, 148 SS, 130; 308/10

[56] References Cited
UNITED STATES PATENTS

| | | | |
|---|---|---|---|
| 374,864 | 12/1887 | Carr | 104/130 X |
| 3,093,090 | 6/1963 | Rosenbaum | 104/130 |
| 3,472,176 | 10/1969 | Trent | 104/130 |
| 3,768,417 | 10/1973 | Thornton et al. | 104/148 SS |

Primary Examiner—Robert S. Ward, Jr.
Attorney, Agent, or Firm—Kenyon & Kenyon Reilly Carr & Chapin

[57] ABSTRACT

An improved mechanically settable switch for a magnetic suspension railroad of the type in which coils in the vehicle react with secondary conductor members installed in the roadbed to provide support and guidance and with a reaction rail for linear propulsion, in which, in the switch area, suspension is provided by a fixed conductor surface covering substantially the full switch area and guidance and propulsion obtained through a single tongue member on one side of the railroad which tongue carries both the secondary conductor for guidance and the reaction member and is movable between a straight position for travel along the straight portion of the switch and a curved position for travel on the curved portion of the switch.

5 Claims, 5 Drawing Figures

MECHANICALLY SETTABLE SWITCH FOR A MAGNETIC SUSPENSION RAILROAD

BACKGROUND OF THE INVENTION

This invention relates to magnetic suspension railroads in general and more particularly to an improved mechanically settable switch for use in such railroads.

In a magnetic suspension railroad, current carrying primary conductor loops are installed in the vehicle and react with secondary loops or conductor plates installed at the roadbed to support and/or guide the vehicle. One type of magnetic suspension railroad is disclosed in the article Model Paper "The Magnetplane; Guided Electromagnetic Flight" by H. Kolm and Richard D. Thornton, Massachusetts Institute of Technology, Cambridge, Massachusetts, published May 1, 1972, pp. 7 and 8. As disclosed therein a section of track about a mile long for use with a magnetic suspension railroad is mounted on sliding bearing supports to make connection with a second or third track possible. Obviously such a design is prohibitively expensive. Thus there is a need for an improved type of mechanically settable switch.

SUMMARY OF THE INVENTION

The present invention provides such a mechanically settable switch which does not require moving the whole section of track as was done in the prior art. Instead, the portions on the roadbed associated with support, i.e., the conductor plates which interact with primary loops in the vehicle to provide support, are installed as continuous non-magnetic surfaces interrupted only by guidance slots for wheels. The secondary conductor loops or plates associated with lateral guidance, along with the reaction rail for the linear motor in the vehicle, are made in the form of a movable tongue which can be moved between two positions one of which will cause the vehicle to travel a straight path and the other of which will cause the vehicle to take a curved path to the other track. Thus full support and guidance functions are maintained throughout with the need of moving only small masses to obtain the switching action. This in turn results in shorter switching times and in lower costs. In addition the system of the present invention requires no changes in the propulsion system or suspension arrangement and does not require bridging any gaps in the area of the switch.

BRIEF DESCRIPTION OF THE DRAWINGS

FIG. 3b is a cross-sectional view through the track roadbed and the vehicle associated with the switch of FIG. 3a.

DETAILED DESCRIPTION OF THE PREFERRED EMBODIMENT

Figure 1:
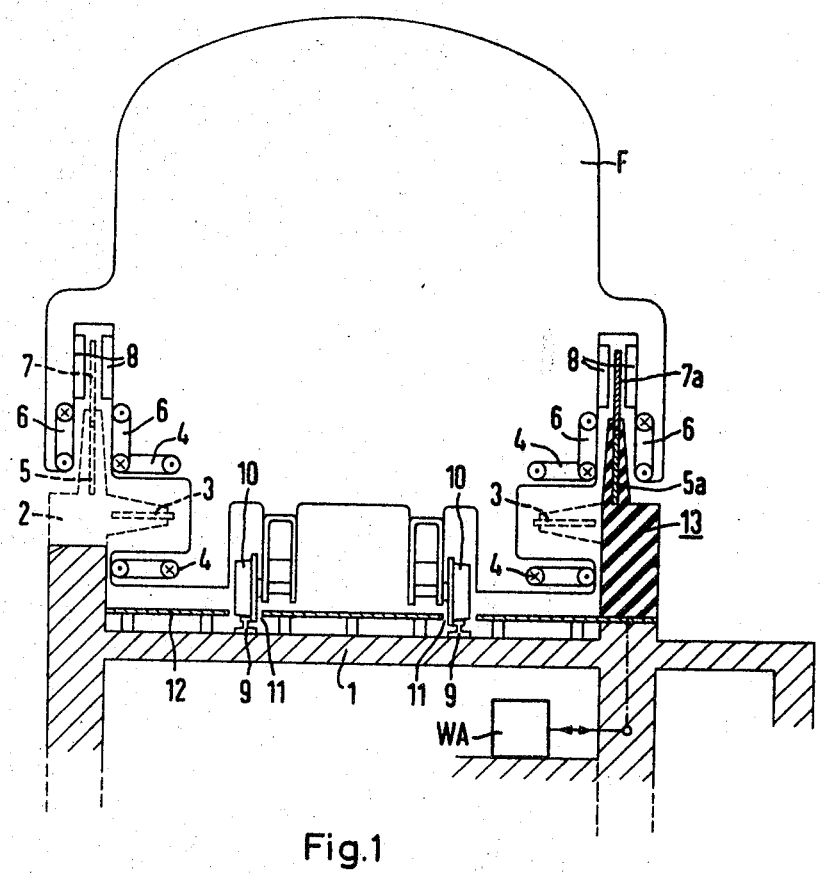
FIG. 1 is a cross-sectional view through a section of roadbed and a vehicle supported thereon.

As illustrated on FIG. 1, the roadbed of the railroad is designated with the numeral 1. On the roadbed are provided support members 2 which carry thereon secondary conductor plates which react with primary conductor loops in the vehicle and in addition carry the reaction rail of the linear motor. The cross section shown is in the area of the switch. The portions shown in dotted lines are those portions normally found on straight sections of track. Thus when on a straight track section, support for the vehicle is provided by the interaction of the primary conductor loops 4 on each side of the vehicle with the secondary conductor plates 3. Lateral guidance is provided by the interaction of the primary conductor loops 6 on each side of the vehicle with their associated secondary conductor plates 5. The plates 7 react with the stators 8 of a linear motor to provide for propulsion forces.

Also shown are tracks 9 supported on the roadbed which contact retractable wheels 10. A plate 12 to be described below is shown and has openings therethrough which allow the wheels 10 to contact the rails 9. In the switch section, the support 2 is replaced by a movable tongue 13 which is only provided on one side as is illustrated by FIG. 1. Because of this, guidance plate 5 associated with tongue 13 is designated thereon as 5a and the reaction rail as 7a. The overall arrangement comprising guidance plate 5a and reaction rail 7a and designated as tongue 13 is also shown on FIG. 2a. The switch of FIG. 2a extends over a long length for example a mile. Thus, the length of the tongue member 13 from entry into the switch to exit therefrom will be approximately one mile. The member 13 is made so that over this long distance it will have sufficient flexibility to take either the curved configuration shown on FIG. 2a or the straight path at the other end of the slots 15 shown thereon. Wheels 10 are normally used only for takeoff and landing. In operation the wheels will be down resting on the track. The linear motor will be started and when sufficient speed is reached so that the magnetic guidance and support forces are operative the wheels will be retracted and guidance and support from then on provided by the interaction between the primary coils in the vehicle and the secondary conductor plates on the roadbed. As can be seen from FIG. 1 secondary plates 3 normally used for support are not provided in the area of the switch. In their place a solid non-magnetic conductor having openings only for the wheels is provided which will interact with the primary conductor loops 4 to provide the necessary support function while within the switch. The manner in which these support forces are generated is described in U.S. application Ser. No. 311,567.

Figure 2A:
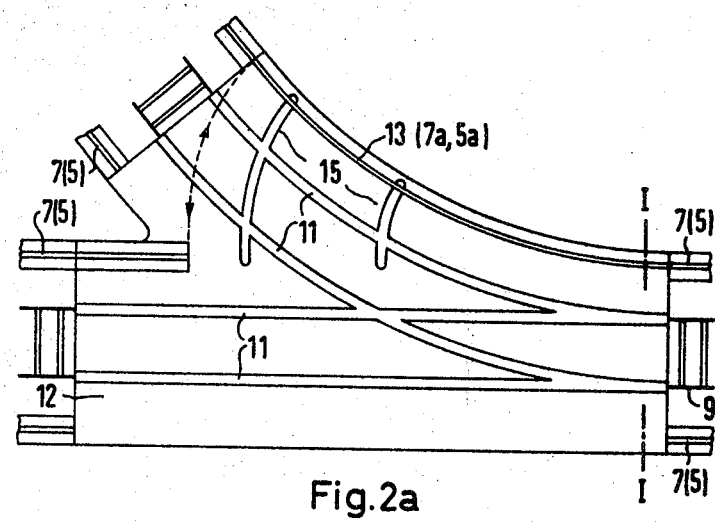
FIG. 2a is a plan view of the area of a switch according to the present invention.

The tongue member 13 will be driven between the curved and straight positions indicated on FIG. 2a by control means designated Wa in conventional fashion. Drive means will be provided to flex the tongue 13 between the two positions with slots such as slots 15 provided for proper guidance thereof. Although only two slots are shown a large plurality of such slots may be provided.

Figure 2B:
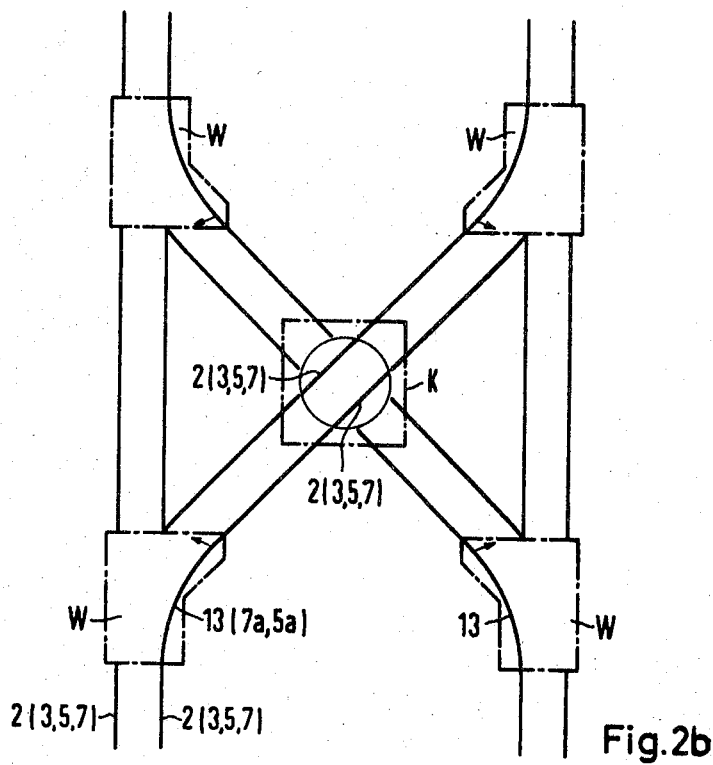
FIG. 2b is a plan view of a crossing arrangement between two parallel tracks.

FIG. 2b illustrates a cross-over arrangement between two parallel sets of tracks having four switches W installed, each of which will be essentially as the switch shown on FIG. 2a, with a rotatable cross-over K in the center. The portion K will have a rotatable section of track which is constructed essentially as shown on the portion FIG. 1 which is in dotted lines, i.e., it will have the same construction as the straight sections of the railroad system.

Figure 3A:
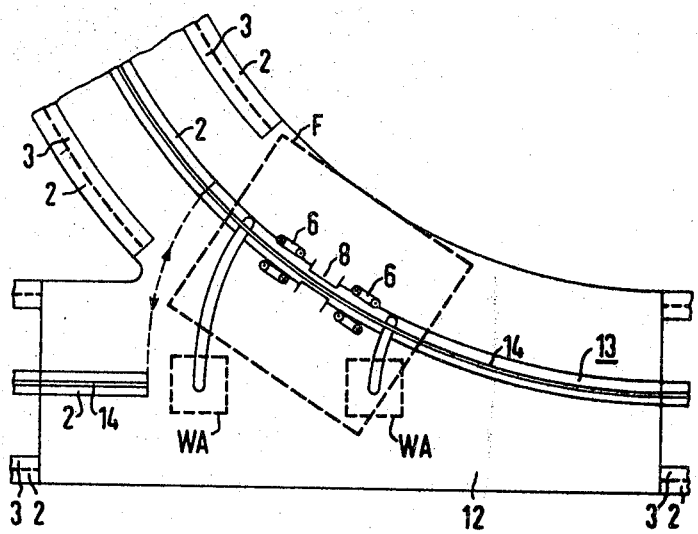
FIG. 3a is a plan view of a second embodiment of the switch of the present invention.
Figure 3B:
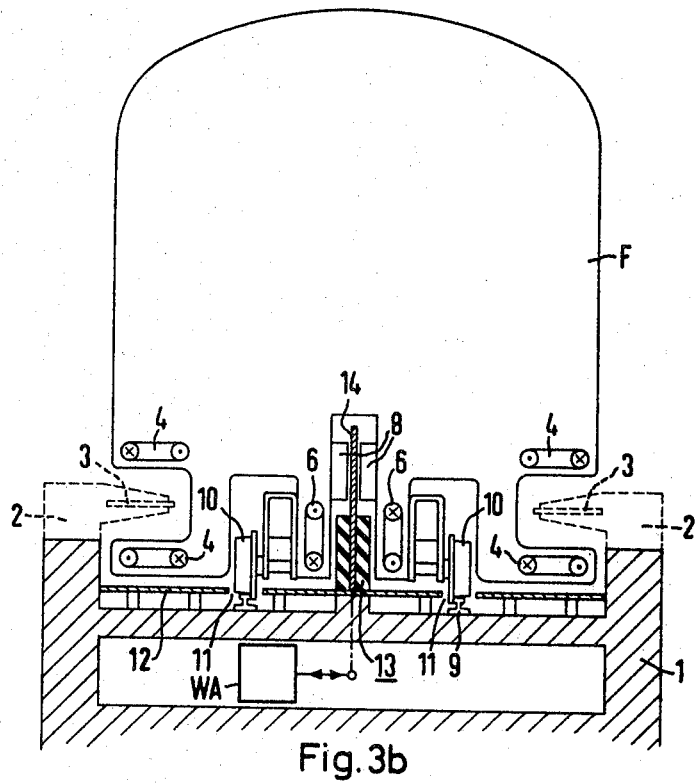

FIGS. 3a and 3b illustrate an additional embodiment of the invention. In this embodiment support is provided in the same manner as discussed in connection with FIG. 1. That is on normal straight sections of the track the interaction between the primary conductor loops 4 and the secondary plates 3 provide necessary support forces whereas within the switch area the interaction between the primary conductor loops 4 and the plate 12 provides the support function. In this arrangement a single rail 14 is supported on tongue 13 and provides the functions both of the secondary conductor plate 5a and the reaction rail 7a of FIG. 1. Single rail 14 providing both these functions is provided in the center of the roadbed where it reacts with the primary coils 6 to provide guidance and with the linear motor stators 8 for propulsion. This results in a simpler design for tongue 13. As illustrated by FIG. 3a the tongue 13 is again movable in a fashion similar to the tongue 13 of FIG. 2a, being driven by control devices or positioning devices Wa. As shown on FIG. 3a, the primary conductor loops 6 are arranged alternatingly in tandem with the stators 8 of the linear motor.

Thus an improved mechanically settable switch has been shown and described. Although specific embodiments have been illustrated and described it will be obvious to those skilled in the art that various modifications may be made without departing from the spirit of the invention which is intended to be limited solely by the appended claims.

What is claimed:

1. A mechanically settable switch for a magnetic suspension railroad in which guidance and support forces are generated by the interaction of primary conductor loops installed in the vehicle and secondary conductor means installed on the roadbed, and wherein propulsion is obtained through a linear motor which comprises stators in the vehicle which react with a reaction rail on the roadbed, comprising:

a. a continuous non-magnetic conductor surface covering essentially the full switch area with which the primary conductor loops may react to support the vehicle while within the switch; and
   b. a tongue movable between the straight portion and the curved portion of the switch, said movable tongue carrying thereon secondary conductor means adapted to react with the primary conductor loops for guidance and a reaction rail for the linear motor.

2. The invention according to claim 1 wherein on straight track sections two parallel reaction rails and two parallel tracks of secondary conductor means for lateral guidance are provided and wherein in said switch only one of said reaction rails and one of said secondary conductor means for guidance are provided.

3. The invention according to claim 2 wherein said single reaction rail and conductor means are provided on the inside of the curve.

4. The invention according to claim 1 wherein said secondary conductor means for lateral guidance and said reaction rail of the linear motor are arranged in the same plane one on top of the other supported by said movable tongue.

5. The invention according to claim 1 wherein a common rail is provided as both the secondary conductor means for lateral guidance and as the reaction rail of the linear motor and wherein the primary conductor loops for the lateral guidance arrangement and the stator windings of the linear motor are arranged alternatingly in tandem in the direction of travel.

* * * * *